(12) United States Patent
Mirsalim et al.

(10) Patent No.: US 11,686,378 B2
(45) Date of Patent: Jun. 27, 2023

(54) CONTINUOUSLY VARIABLE TRANSMISSION

(71) Applicants: Seyed Mostafa Mirsalim, Tehran (IR); Hadi Saburi, Tehran (IR); Masoud Sobhani, Tehran (IR); Alireza Yaghubi, Tehran (IR); Mojtaba Pakbaz Miyab, Tehran (IR); Mohammad Hasanali, Tehran (IR); Gholamhasan Payganeh, Tehran (IR); Mehrdad Nouri Khajavi Tehrani, Tehran (IR)

(72) Inventors: Seyed Mostafa Mirsalim, Tehran (IR); Hadi Saburi, Tehran (IR); Masoud Sobhani, Tehran (IR); Alireza Yaghubi, Tehran (IR); Mojtaba Pakbaz Miyab, Tehran (IR); Mohammad Hasanali, Tehran (IR); Gholamhasan Payganeh, Tehran (IR); Mehrdad Nouri Khajavi Tehrani, Tehran (IR)

(73) Assignees: ASAK COMPANY, Tehran (IR); SHAHID RAJAYI UNIVERSITY, Tehran (IR)

( * ) Notice: Subject to any disclaimer, the term of this patent is extended or adjusted under 35 U.S.C. 154(b) by 0 days.

(21) Appl. No.: 17/893,133

(22) Filed: Aug. 22, 2022

(65) Prior Publication Data
US 2022/0397185 A1 Dec. 15, 2022

Related U.S. Application Data

(63) Continuation-in-part of application No. PCT/IB2021/051487, filed on Feb. 22, 2021.
(Continued)

(51) Int. Cl.
*F16H 35/00* (2006.01)
*F16H 47/04* (2006.01)
*F16H 15/50* (2006.01)

(52) U.S. Cl.
CPC .............. *F16H 47/04* (2013.01); *F16H 15/50* (2013.01); *F16H 2035/001* (2013.01)

(58) Field of Classification Search
CPC ..... F16H 47/04; F16H 15/50; F16H 2035/001
See application file for complete search history.

(56) References Cited

U.S. PATENT DOCUMENTS 4,275,870 A * 6/1981 Henneman ............ F16H 61/433
254/361
5,472,382 A * 12/1995 Aramendia ............. F16H 3/722
475/92
(Continued)

OTHER PUBLICATIONS

International Search Report and Written Opinion dated Feb. 6, 2021 by the International Searching Authority (Indian Patent Office) in PCT Application PCT/IB2021/051487.

*Primary Examiner* — Justin Holmes
(74) *Attorney, Agent, or Firm* — Bajwa IP Law Firm; Haris Zaheer Bajwa

(57) ABSTRACT

A continuously variable transmission including a main planetary gear set. A sun gear of the main planetary gear set coupled to an input shaft and a ring gear of the main planetary gear set may be coupled to an output shaft. A continuous range of transmission ratios between the input shaft and the output shaft provided by gradually changing an rpm of a carrier of the main planetary gear set. To this end a vane coupling mechanism may be coupled with the main planetary gear set. The vane coupling mechanism including an inner rotor coupled with the main carrier, where the inner (Continued)

rotor may be rotatably disposed within an outer rotating chamber. The outer rotating chamber coupled with the main sun gear.

11 Claims, 8 Drawing Sheets

Related U.S. Application Data

(60) Provisional application No. 62/980,156, filed on Feb. 22, 2020.

(56) References Cited

U.S. PATENT DOCUMENTS

| | | | | |
|---|---|---|---|---|
| 5,951,424 A | * | 9/1999 | Briceland | F16H 47/04 475/72 |
| 6,135,909 A | * | 10/2000 | Keiser | F16H 3/722 475/108 |
| 2013/0005524 A1 | | 1/2013 | Waugh | |

* cited by examiner

CONTINUOUSLY VARIABLE TRANSMISSION

CROSS-REFERENCE TO RELATED APPLICATIONS

This application is a continuation-in-part of international Application No. PCT/IB2021/051487, filed Feb. 22, 2021, and entitled "CONTINUOUSLY VARIABLE TRANSMISSION," which claims the benefit of priority from pending U.S. Provisional Patent Application Ser. No. 62/980,156, filed on Feb. 22, 2020, and entitled "LIQUID GEAR TRANSMISSION (LGT)," which are both incorporated herein by reference in their entirety.

TECHNICAL FIELD

The present disclosure relates to power transmission systems, particularly continuously variable transmissions. More particularly, the present disclosure relates to a continuously variable transmission equipped with a hydraulic coupling mechanism.

BACKGROUND

A mechanical power transmission system may be used to provide rotational speed conversions from a rotating power source to a rotating output with a desired rotational speed. A multi-speed power transmission may be one possible solution for providing different output rotational speeds from a power source that operates at a constant rotational speed. A multi-speed power transmission may be a manual transmission, which may include multiple transmission ratios that allows a user to manually select a gear ratio from among discrete and finite transmission ratios utilizing a gear stick and a clutch.

A multi-speed power transmission may alternatively be an automatic transmission in which, as the name indicates, transmission ratios are automatically selected. An automatic transmission uses gears and a clutch system to automatically change gears. However, providing a continuous transmission of rotational speed from a power source to an output still remains a challenge. One possible solution for providing a continuous transmission may be utilizing a continuously variable transmission (CVT), in which a continuous range of transmission ratios are provided.

One common type of CVT is a hydraulic CVT transmission, in which planetary gear sets are utilized. A planetary gear set may include three rotating elements, namely, a sun gear, a ring gear, and a planetary gear carrier. Two elements of these three rotating elements may be configured to serve as an inputs, while a third element may be configured to serve as an output. An output rotational speed of the third element may be determined by rotational speeds of the first and second elements. Therefore, the output rotational speed may be controlled by manipulating the rotational speeds of the first and second elements.

In a CVT, a torque converter may be utilized to connect a power source to a planetary gear set of the hydraulic CVT as an alternative to a mechanical clutch. A torque converter may include two rotating elements, one of which may be an input element connected to a power source and the other may be an output element connected to a planetary gear set. A flow of a hydraulic fluid between the two elements may transmit the torque of the input element to the output element. A torque converter may provide a transmission ratio that changes continuously and automatically from zero to one without any external control system.

There is still a need for a coupling system that may provide a large and continuous range for a transmission ratio of a continuously variable transmission, which may be accurately determined and adjusted with an external control system. There is further a need for a coupling system that may provide an adjustable connection between two elements of a planetary gear set and make them interdependent.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a continuously variable transmission (CVT). An exemplary CVT may include an input shaft that may be rotatable about a longitudinal axis of an exemplary input shaft and a main planetary gear assembly. An exemplary main planetary gear assembly may include a main sun gear that may be coupled and rotatable with an exemplary input shaft about an exemplary longitudinal axis of an exemplary input shaft, a main carrier, and a main ring gear.

An exemplary CVT may further include a secondary planetary gear assembly. An exemplary secondary planetary gear assembly may include a secondary sun gear that may be coupled and rotatable with an exemplary input shaft about an exemplary longitudinal axis of an exemplary input shaft, a secondary carrier, and a secondary ring gear that may be coupled and rotatable with an exemplary main carrier about an exemplary longitudinal axis of an exemplary input shaft.

An exemplary CVT may further include an eccentric gear set. An exemplary eccentric gear set may include a first gear that may be mounted in a fixed bearing unit. An exemplary first gear may be coupled and rotatable with an exemplary secondary carrier about an exemplary longitudinal axis of an exemplary input shaft. An exemplary eccentric gear set may further include a second gear that may be mounted within and meshed with an exemplary first gear. An exemplary second gear may be smaller than an exemplary first gear with a ratio of at most 1:10. An exemplary second gear may be rotatable with an exemplary first gear about an exemplary longitudinal axis of an exemplary input shaft.

An exemplary CVT may further include a vane coupling mechanism. An exemplary vane coupling mechanism may include a rotatable outer chamber that may be coupled and rotatable with an exemplary input shaft about an exemplary longitudinal axis of an exemplary input shaft.

An exemplary rotatable outer chamber may include a cam ring that may be disposed between two seal plates and two inlet/outlet ports in fluid communication with an exemplary rotatable outer chamber. Exemplary two inlet/outlet ports may further be connected in fluid communication with each other via a fluid passageway. An exemplary rotatable outer chamber may be filled with hydraulic fluid.

An exemplary vane coupling mechanism may further include a control valve that may be mounted on an exemplary fluid passageway. An exemplary control valve may be configured to control hydraulic fluid flow within an exemplary fluid passageway by opening/closing an exemplary fluid passageway.

An exemplary vane coupling mechanism may further include an inner rotor that may be coaxially disposed within an exemplary cam ring. An exemplary inner rotor may be coupled and rotatable with an exemplary second gear. In an exemplary embodiment, an exemplary CVT may further include an output shaft that may be coupled and rotatable with an exemplary main ring gear.

In an exemplary embodiment, an exemplary CVT may further include a controller that may be coupled with an exemplary control valve. An exemplary controller may be configured to change a valve position of an exemplary control valve. An exemplary valve position may include a position between a fully closed position and a fully opened position.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

Figure 1:
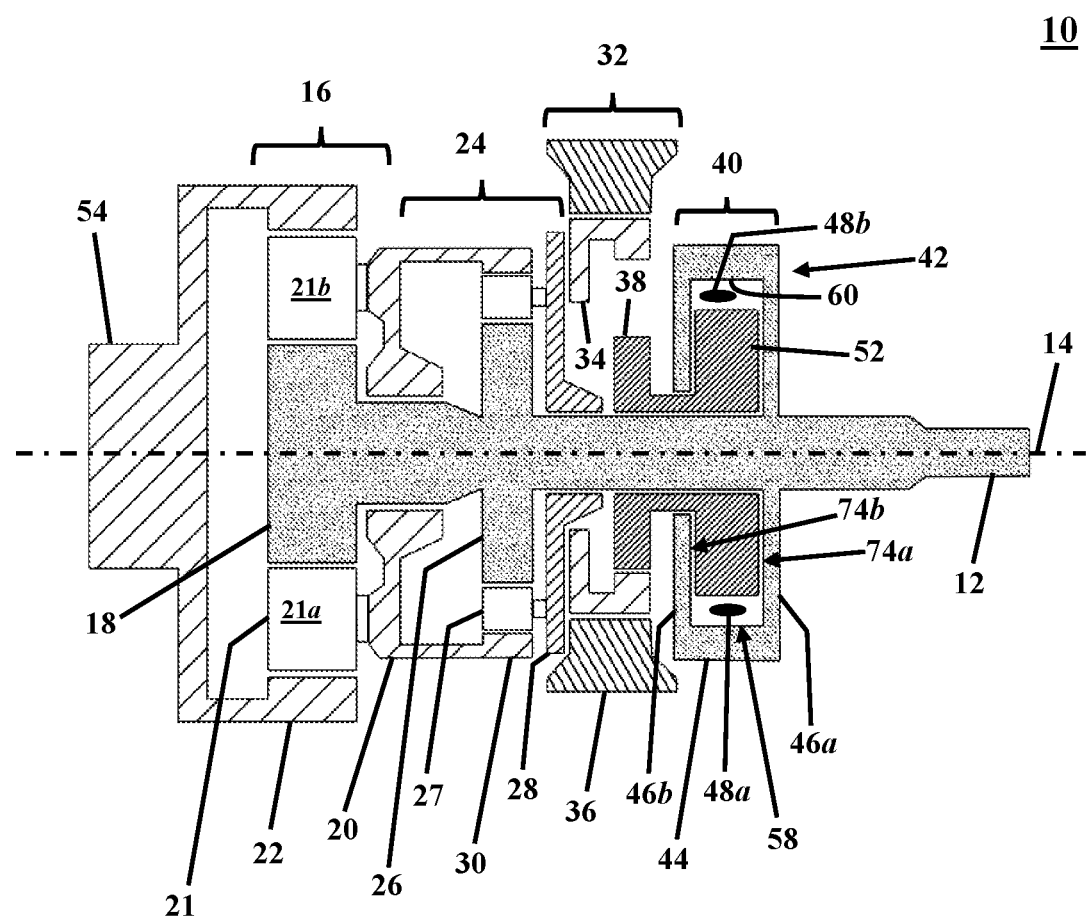
FIG. 1 illustrates a sectional side-view of a continuously variable transmission (CVT), consistent with one or more exemplary embodiments of the present disclosure.

FIG. 1 illustrates a sectional side-view of a continuously variable transmission (CVT) 10, consistent with one or more exemplary embodiments of the present disclosure. In an exemplary embodiment, CVT 10 may include an input shaft 12 that may be rotatable about a longitudinal axis 14 of input shaft 12. In an exemplary embodiment, longitudinal axis 14 of input shaft 12 may be the main axis of rotation of CVT 10, as will be discussed in the following paragraphs.

Figure 4A:
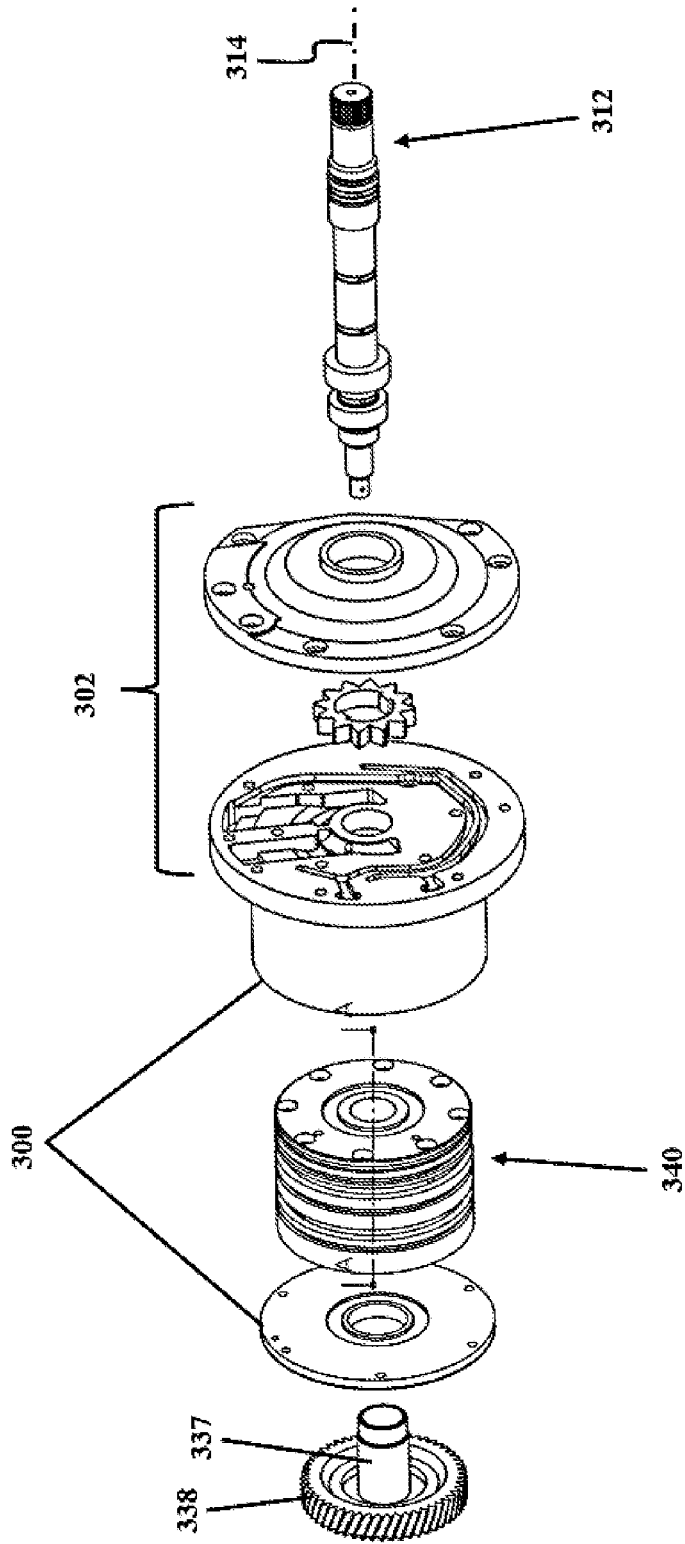
FIGS. 4A-4D illustrate exploded views of various sections of a CVT, consistent with one or more exemplary embodiments of the present disclosure.
Figure 4B:
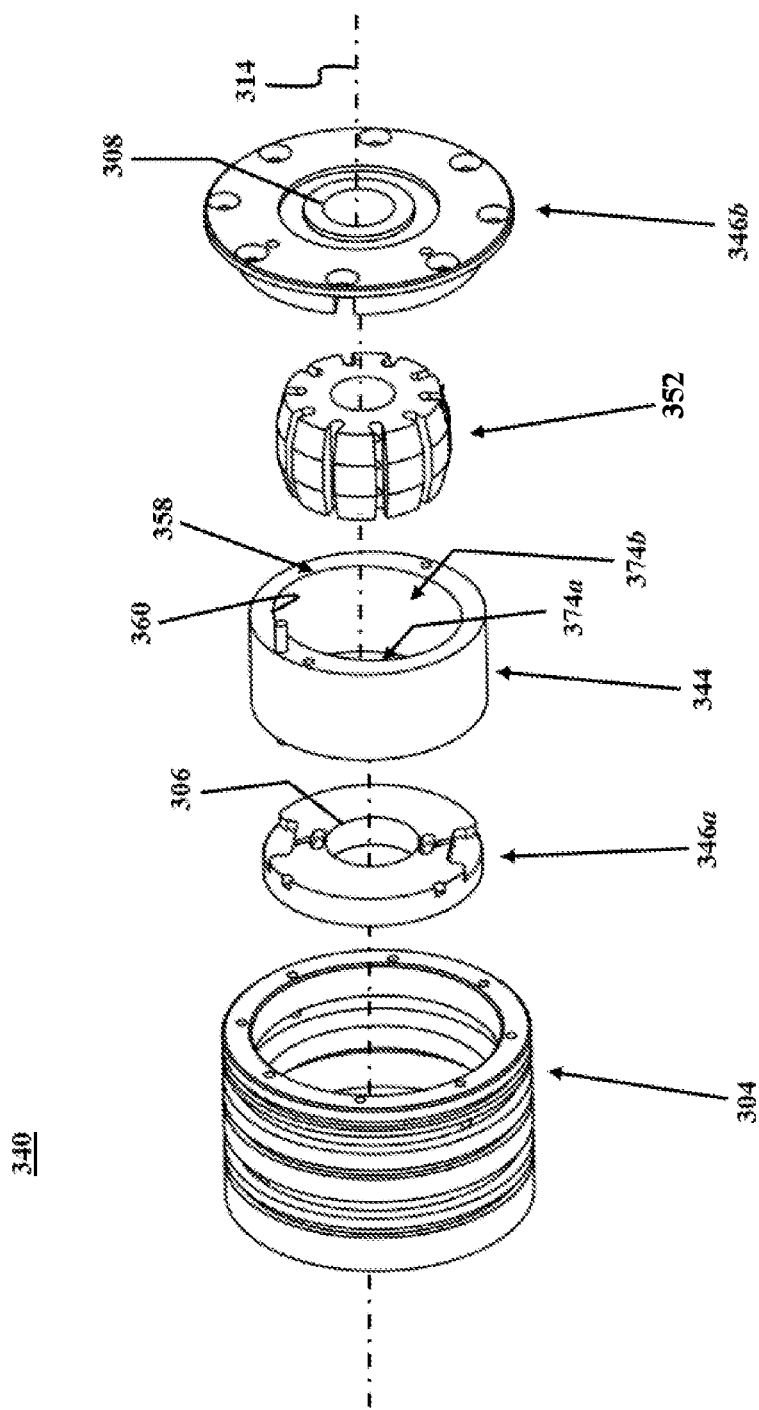
Figure 4C:
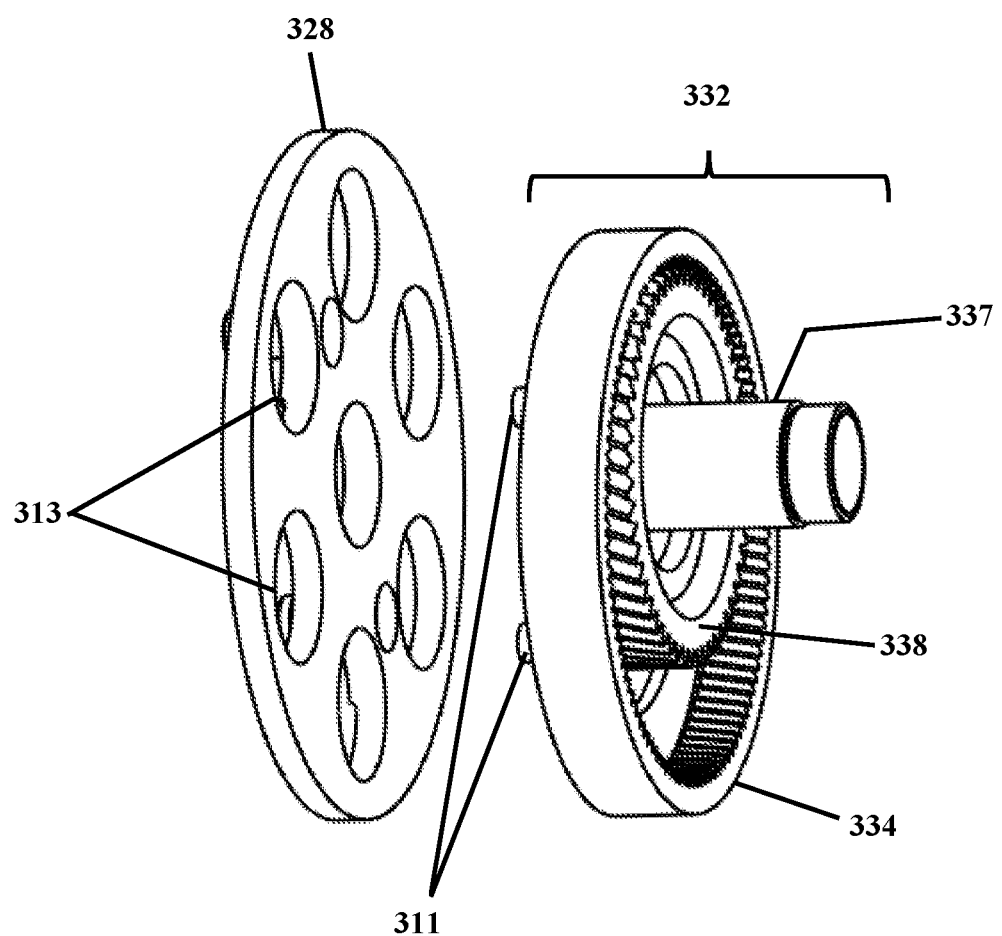
Figure 4D:
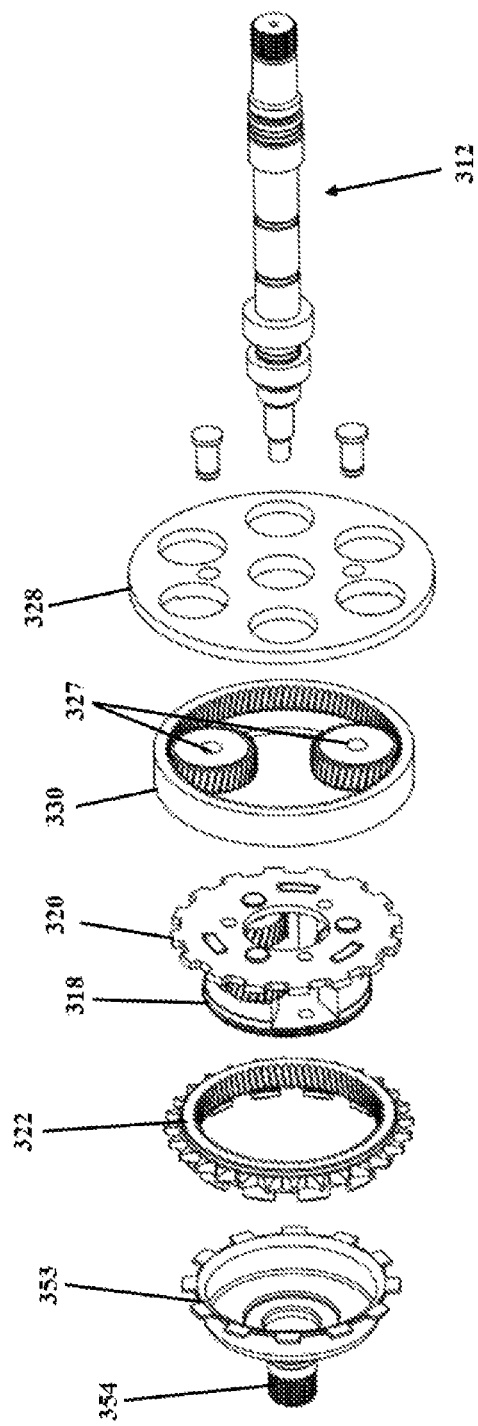

In an exemplary embodiment, CVT 10 may further include a main planetary gear assembly 16 that may be coupled with input shaft 12. In an exemplary embodiment, main planetary gear assembly 16 may include a main sun gear 18 that may be coupled and coaxially rotatable with input shaft 12, a main carrier 20, and a main ring gear 22. In an exemplary embodiment, main sun gear 18 may be rotatable about longitudinal axis 14 of input shaft 12. In an exemplary embodiment, main carrier 20 may be attached to and rotatable with a main planet gear set 21. In an exemplary embodiment, main planet gear set 21 may include a number of pinions, such as pinions (21a and 21b) that may be mechanically engaged with both main sun gear 18 and main ring gear 22. In an exemplary embodiment, CVT 10 may further include an output shaft 54 that may be coupled and coaxially rotatable with main ring gear 22. In an exemplary embodiment, main carrier 20 may be similar to main carrier 320 illustrated in FIG. 4b and explained in more detail below.

In an exemplary embodiment, CVT 10 may further include a secondary planetary gear assembly 24 that may include a secondary sun gear 26 that may be coupled and coaxially rotatable with input shaft 12 about longitudinal axis 14 of input shaft 12, a secondary carrier 28, and a secondary ring gear 30 that may be coupled and coaxially rotatable with main carrier 20 about longitudinal axis 14 of input shaft 12. In an exemplary embodiment, secondary carrier 28 may be attached to and rotatable with a secondary planet gear set 27. In an exemplary embodiment, secondary planet gear set 27 may include a number of pinions that may be mechanically engaged with both secondary sun gear 26 and secondary ring gear 30.

In an exemplary embodiment, CVT 10 may further include an eccentric gear set 32 that may include a first gear 34 that may be mounted in a bearing unit 36. In an exemplary embodiment, first gear 34 may be coupled and coaxially rotatable with secondary carrier 28 about longitudinal axis 14 of input shaft 12. In an exemplary embodiment, eccentric gear set 32 may further include a second gear 38 that may be mounted within and meshed with first gear 34. In other words, second gear 38 may mechanically engage first gear 34, such that rotation of second gear 38 may correspond to rotation of first gear 34. In an exemplary embodiment, second gear 38 may be smaller than first gear 34 with a ratio of at most 1:10. In an exemplary embodiment, second gear 38 may be rotatable with first gear 34 about longitudinal axis 14 of input shaft 12. In an exemplary embodiment, bearing unit 36 may include a journal bearing unit that may function as a guide for eccentric gear set 32. In an exemplary embodiment, mounting second gear 38 inside first gear 34 may allow for first gear 34 and second gear 38 to rotate in a similar direction about longitudinal axis 14, as the primary axis of rotation.

Figure 2A:
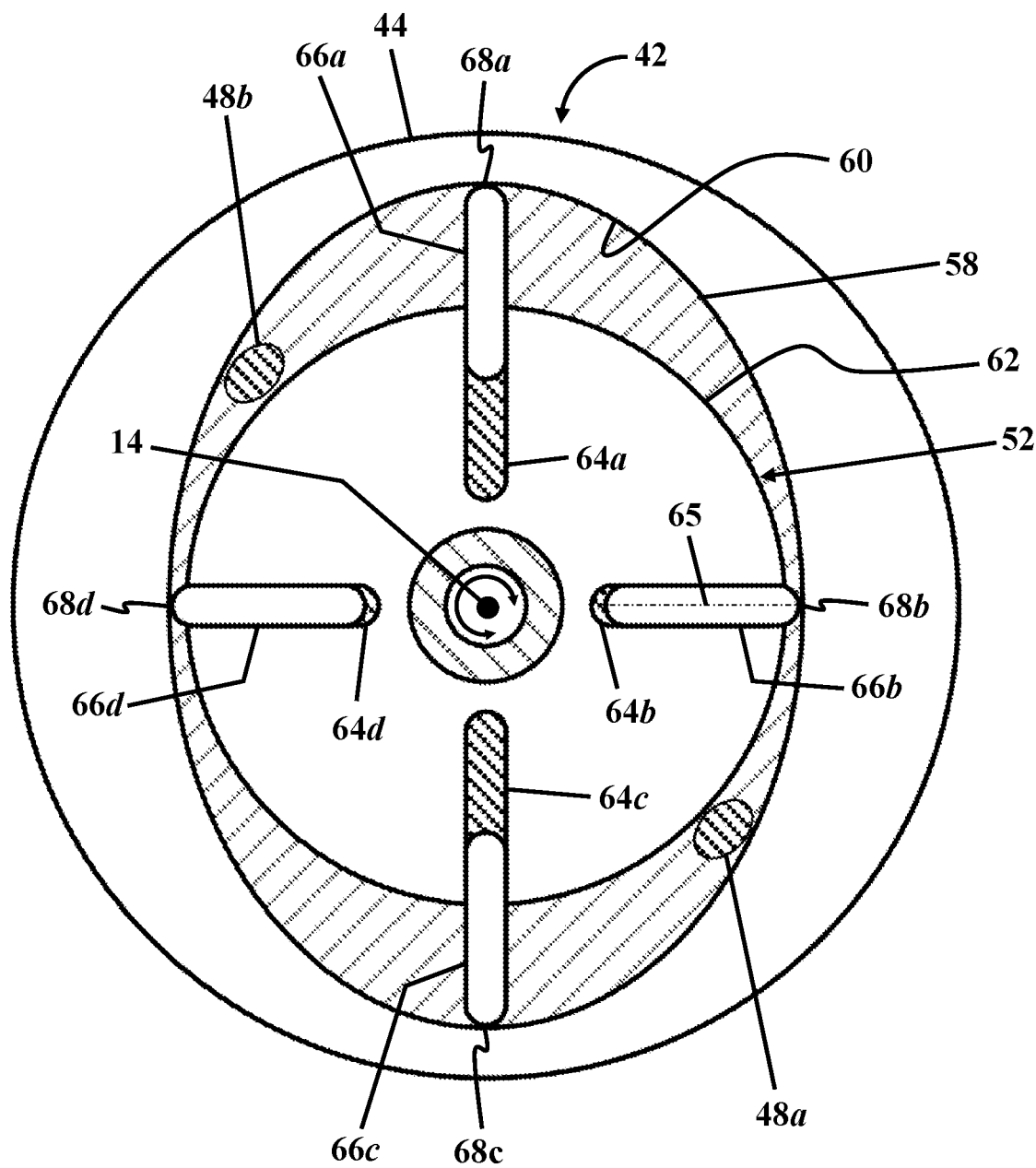
FIG. 2A illustrates a sectional front view of a vane coupling mechanism, consistent with one or more exemplary embodiments of the present disclosure.

FIG. 2A illustrates a sectional front view of a vane coupling mechanism 40, consistent with one or more exemplary embodiments of the present disclosure. In an exemplary embodiment, CVT 10 may further include vane coupling mechanism 40 that may include a rotatable outer chamber 42 that may be coupled and coaxially rotatable with input shaft 12 about longitudinal axis 14 of input shaft 12. In an exemplary embodiment, rotatable outer chamber 42 may include a cam ring 44 that may be disposed between two seal plates (46a and 46b). In an exemplary embodiment, cam ring 44 may include an ellipsoidal opening 58 with an ellipsoidal inner surface 60, where ellipsoidal opening 58 may be sealed between seal plates (46a and 46b).

In an exemplary embodiment, seal plates (46a and 46b) may be attached at both open ends (74a and 74b) of cam ring 44, where open ends (74a and 74b) may be spaced apart along longitudinal axis 14 of input shaft 12 with planes of open ends (74a and 74b) perpendicular to longitudinal axis 14 of input shaft 12. In an exemplary embodiment, seal plates (46a and 46b) and cam ring 44 may be rotatable together about longitudinal axis 14 of input shaft 12 and seal plates (46a and 46b) may be attached to cam ring 44 in axial and angular alignment with cam ring 44 without relative rotational movements between seal plates (46a and 46b) and cam ring 44. In an exemplary embodiment, rotatable outer chamber 42 may include two inlet/outlet ports (48a and 48b) in fluid communication with an inner volume of rotatable outer chamber 42.

Figure 2B:
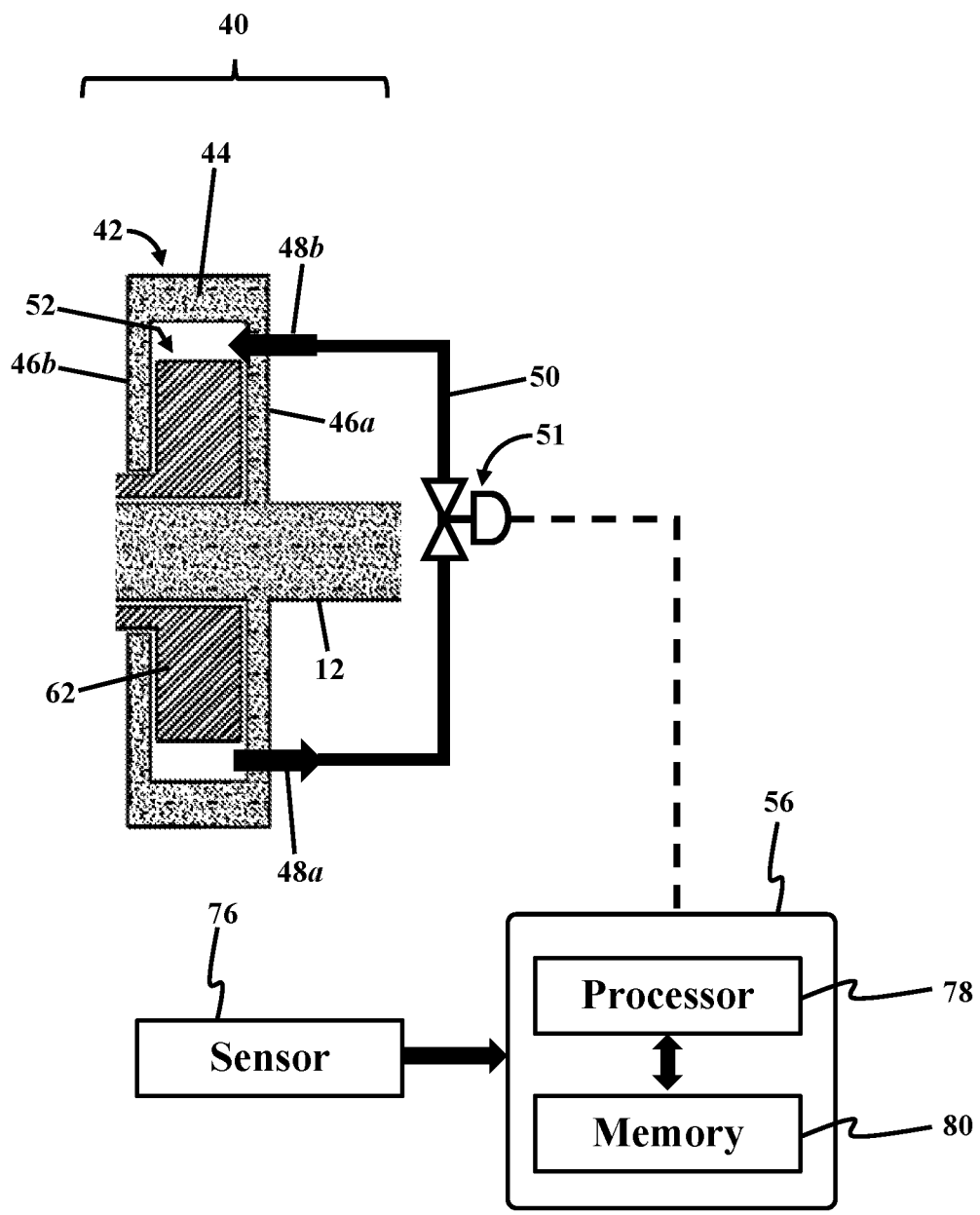
FIG. 2B illustrates a schematic side-view of a vane coupling mechanism and a block diagram of a control scheme for a vane coupling mechanism, consistent with one or more exemplary embodiments of the present disclosure.

FIG. 2B illustrates a schematic side-view of vane coupling mechanism 40 and a block diagram of a control scheme for vane coupling mechanism 40, consistent with one or more exemplary embodiments of the present disclosure. In an exemplary embodiment, inlet/outlet ports (48a and 48b) may further be connected in fluid communication with each other via a fluid passageway 50. In an exemplary embodiment, vane coupling mechanism 40 may further include a control valve 51 that may be mounted on fluid passageway 50 and may be configured to control hydraulic fluid flow within fluid passageway 50 by opening/closing fluid passageway 50.

In an exemplary embodiment, vane coupling mechanism 40 may further include an inner rotor 52 that may be coaxially disposed within cam ring 44. In an exemplary embodiment, inner rotor 52 may be coupled and coaxially rotatable with second gear 38 of eccentric gear set 32. As mentioned before, in an exemplary embodiment, first gear 34 of eccentric gear set 32 may be attached to and coaxially rotatable with secondary carrier 28, consequently eccentric gear set 32 may transfer the torque from secondary carrier 28 to inner rotor 52 with a gear ratio of at most 10 to 1. Such arrangement of eccentric gear set 32 and such gear ratio between first gear 34 and second gear 38 of eccentric gear set 32 may allow for configuring eccentric gear set 32 to transfer the rotational movement of secondary carrier 28 to inner rotor 52 with an increased revolutions per minute (rpm). In an exemplary embodiment, such increase in the rpm utilizing eccentric gear set 32 may ensure that a rotational speed of inner rotor 52 is higher than a rotational speed of rotatable outer chamber 42, benefits of which is discussed later in this disclosure.

In an exemplary embodiment, inner rotor 52 may include a cylindrical main body 62 that may be coaxially disposed within ellipsoidal opening 58 of cam ring 44, radially extended vane slots (64a-64d) on cylindrical main body 62, and corresponding vanes (66a-66d) that may be slidably disposed within respective vane slots (64a-64d). In an exemplary embodiment, each vane of vanes (66a-66d) may be radially slidable along a longitudinal axis of a respective vane slot of vane slots (64a-64d), such that tips (68a-68d) of vanes (66a-66d) may contact ellipsoidal inner surface 60 of cam ring 44. In an exemplary embodiment, vanes (66a-66d) may be rotatable with inner rotor 52 about longitudinal axis 14 of input shaft 12. As used herein, a longitudinal axis of an object may refer to an axis associated with the longest dimension of that object. For example, longitudinal axis 65 of vane slot 68b is illustrated and labeled in FIG. 2A.

In an exemplary embodiment, rotatable outer chamber 42 may be filled with a hydraulic fluid, such as air or hydraulic oil. In an exemplary embodiment, an internal volume of rotatable outer chamber 42 between an inner surface of rotatable outer chamber 42 and an outer surface of cylindrical main body 62 of inner rotor 52 may be filled with the hydraulic fluid. In an exemplary embodiment, an entire volume of fluid passageway 50 may also be filled with the hydraulic fluid. In an exemplary embodiment, CVT 10 may further include a controller 56 that may be coupled with control valve 51. In an exemplary embodiment, controller 56 may be configured to change a valve position of control valve 51, where the valve position may include a position between a fully closed position and a fully opened position.

Figure 3:
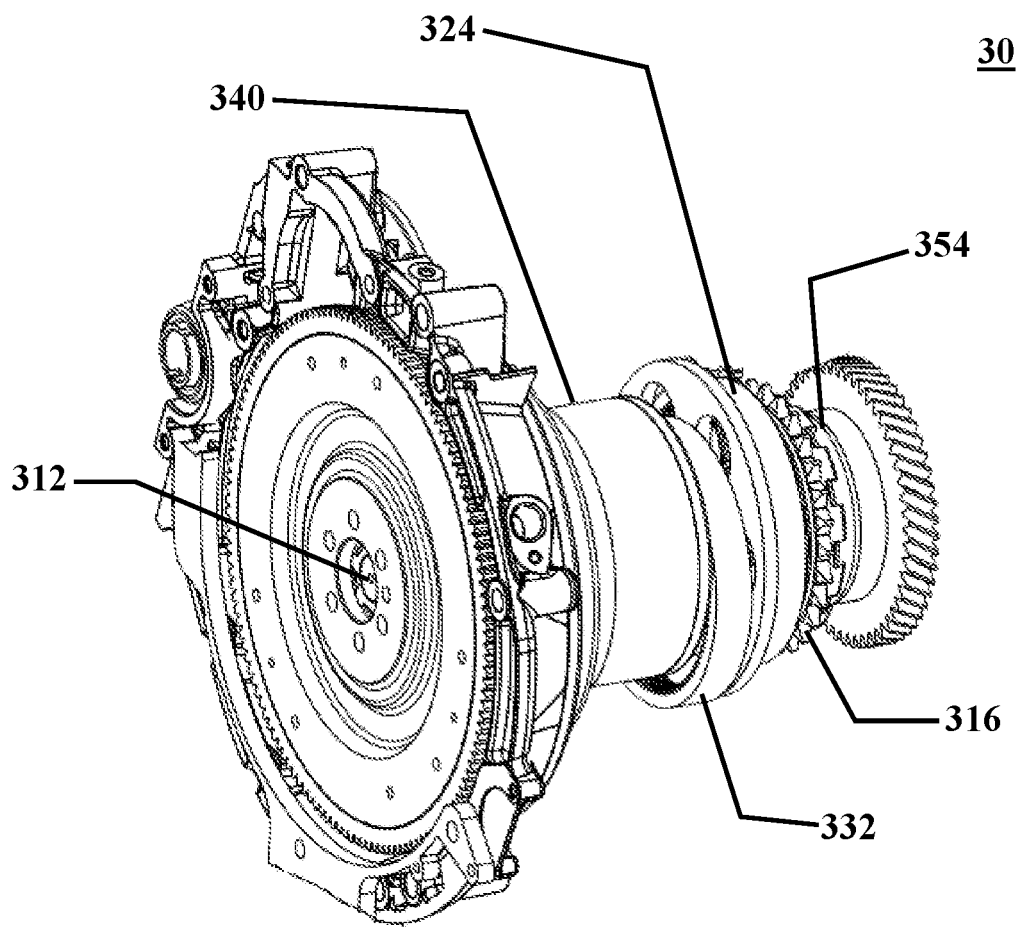
FIG. 3 illustrates a perspective view of a CVT, consistent with one or more exemplary embodiments of the present disclosure.

FIG. 3 illustrates a perspective view of a CVT 30, consistent with one or more exemplary embodiments of the present disclosure. FIGS. 4A-4D illustrate exploded views of various sections of CVT 30, consistent with one or more exemplary embodiments of the present disclosure. In an exemplary embodiment, CVT 30 may be structurally and functionally similar to CVT 10 and may include an input shaft 312 similar to input shaft 12 and an output shaft 354 similar to output shaft 54. In an exemplary embodiment, CVT 30 may further include a vane coupling mechanism 340 similar to vane coupling mechanism 40, a main planetary gear assembly 316 similar to main planetary gear assembly 16 and a secondary planetary gear assembly 324 similar to secondary planetary gear assembly 24. In an exemplary embodiment, CVT 30 may further include an eccentric gear set 332 that may be similar to eccentric gear set 32.

In an exemplary embodiment, vane coupling mechanism 340 may be enclosed in a sealed housing 300 that may be attached to a gear pump 302. In an exemplary embodiment, gear pump 302 may be configured to get hydraulic fluid to circulate around CVT 30 via passageways designed in CVT 30 for lubrication and hydraulic fluid flow, which are not described or illustrated in detail for simplicity. In an exemplary embodiment, vane coupling mechanism 340 may include a rotatable cam ring 344 similar to rotatable cam ring 44 that may be coupled and coaxially rotatable with input shaft 312 about a longitudinal axis 314 of input shaft 312. In an exemplary embodiment, cam ring 344 may be disposed between two seal plates (346a and 346b) similar to seal plates (46a and 46b). In an exemplary embodiment, cam ring 344 may include an ellipsoidal opening 358 with an ellipsoidal inner surface 360, where ellipsoidal opening 358 may have two open ends (374a and 374b) that may be sealed by seal plates (346a and 346b). In an exemplary embodiment, cam ring 344 may be rotatably housed within a housing 304, which may then be housed within sealed housing 300. In an exemplary embodiment, seal plates (346a and 346b) and cam ring 344 may be rotatable together within housing 304 about longitudinal axis 314 of input shaft 312. In an exemplary embodiment, seal plates (346a and 346b) may be attached to cam ring 344 in axial and angular alignment with cam ring 344 without relative rotational movements between seal plates (346a and 346b) and cam ring 344. In an exemplary embodiment, vane coupling mechanism 340 may further include two inlet/outlet ports similar to two inlet/outlet ports (48a and 48b) in fluid communication with an internal volume of cam ring 344. In an exemplary embodiment, similar to inlet/outlet ports (48a and 48b), the inlet/outlet ports of vane coupling mechanism 340 may further be connected in fluid communication with each other via a fluid passageway similar to fluid passageway 50. As mentioned before, details of fluid passages incorporated in seal plates and housings are not illustrated for simplicity. In an exemplary embodiment, the inlet/outlet ports and the fluid passageway connecting the inlet/outlet ports of vane coupling mechanism 340 may be formed in at least one of seal plates (346a and 346b).

In an exemplary embodiment, vane coupling mechanism 340 may further include an inner rotor 352 similar to inner rotor 52 that may be coaxially disposed within cam ring 344.

In an exemplary embodiment, inner rotor 352 may include a main body 362 that may be coaxially disposed within ellipsoidal opening 358 of cam ring 344, radially extended vane slots (364a-364d) similar to vane slots (64a-64d) on main body 362, and corresponding vanes (not illustrated) similar to vanes (66a-66d) that may be slidably disposed within respective vane slots (364a-364d). In an exemplary embodiment, seal plates (346a and 346b) may include corresponding central holes (306 and 308) that may be fitted with bearings (not illustrated) to allow for input shaft 312 to pass through seal plates (346a and 346b). In an exemplary embodiment, inner rotor 352 may be mounted on and coaxially rotatable with main shaft 312.

In an exemplary embodiment, CVT 30 may further include an eccentric gear set 332 similar to eccentric gear set 32 that may include a first gear 334 similar to first gear 34 and a second gear 338 similar to second gear 38 that may be mounted within and meshed with first gear 334. In other words, second gear 338 may mechanically engage first gear 334, such that rotation of second gear 338 may correspond to rotation of first gear 334. In an exemplary embodiment, second gear 338 may be smaller than first gear 334 with a ratio of at most 1:10. In an exemplary embodiment, second gear 338 may be rotatable with first gear 334 about longitudinal axis 314 of input shaft 312. In an exemplary embodiment, mounting second gear 338 inside first gear 334 may allow for first gear 334 and second gear 338 to rotate in a similar direction about longitudinal axis 314 as the primary axis of rotation. In an exemplary embodiment, inner rotor 352 may be coupled and coaxially rotatable with second gear 338 of eccentric gear set 332 via a hollow shaft 337. In an exemplary embodiment, such arrangement of hollow shaft 337 may allow for input shaft 312 to pass through hollow shaft 337 without being coupled to inner rotor 352.

In an exemplary embodiment, main planetary gear assembly 316 may be coupled with input shaft 312. In an exemplary embodiment, main planetary gear assembly 316 may include a main sun gear 318 similar to main sun gear 18 that may be coupled and coaxially rotatable with input shaft 312 about longitudinal axis 314 of input shaft 312, a main carrier 320 similar to main carrier 20, and a main ring gear 322 similar to main ring gear 22. In an exemplary embodiment, main carrier 320 may be attached to and rotatable with a main planet gear set (obscured from view) similar to main planet gear set 21. In an exemplary embodiment, output shaft 354 may be coupled via a coupling member 353 with main ring gear 322. Consequently, output shaft 354 may be coaxially rotatable with main ring gear 322.

In an exemplary embodiment, CVT 30 may further include a secondary planetary gear assembly 324 similar to secondary planetary gear assembly 24 that may include a secondary sun gear (not illustrated) similar to secondary sun gear 26 that may be coupled and coaxially rotatable with input shaft 312 about longitudinal axis 314 of input shaft 312, a secondary carrier 328 similar to secondary carrier 28, and a secondary ring gear 330 similar to secondary ring gear 30 that may be coupled and coaxially rotatable with main carrier 320 about longitudinal axis 314 of input shaft 312. In an exemplary embodiment, secondary carrier 328 may be attached to and rotatable with a secondary planet gear set 327 similar to secondary planet gear set 27. In an exemplary embodiment, secondary planet gear set 327 may include a number of pinions that may be mechanically engaged with both secondary sun gear and secondary ring gear 330.

In an exemplary embodiment, first gear 334 may be coupled and coaxially rotatable with secondary carrier 328 about longitudinal axis 314 of input shaft 312. To this end, in an exemplary embodiment, secondary carrier 328 may include a plurality of oval holes 313 that may engage with a plurality of corresponding pins 311 protruding from first gear 334.

In an exemplary embodiment, inner rotor 352 may be coupled and coaxially rotatable with second gear 338 of eccentric gear set 332. As mentioned before, in an exemplary embodiment, first gear 334 of eccentric gear set 332 may be attached to and coaxially rotatable with secondary carrier 328, consequently eccentric gear set 332 may transfer the torque from secondary carrier 328 to inner rotor 352 with a gear ratio of at most 10 to 1. Such arrangement of eccentric gear set 332 and such gear ratio between first gear 334 and second gear 338 of eccentric gear set 332 may allow for configuring eccentric gear set 332 to transfer the rotational movement of secondary carrier 328 to inner rotor 352 with an increased revolutions per minute (rpm). In an exemplary embodiment, such increase in the rpm utilizing eccentric gear set 332 may ensure that a rotational speed of inner rotor 352 is higher than a rotational speed of rotatable cam ring 344.

In an exemplary embodiment, an exemplary continuously variable transmission such as CVT 10 and CVT 30 may be utilized to transmit power between input shaft (12, 312) and output shaft (54, 354) in various applications, such as in oil and gas industries, power plants, automotive industry, and trains. In an exemplary embodiment, input shaft (12, 312) may be coupled to a power source such as a turbine, electric motor, or an internal combustion engine and then CVT (10, 30) may be utilized for manipulating the torque and horsepower transmitted via output shaft (54, 354). In an exemplary embodiment, CVT (10, 30) may allow for a continuous change from lower gear ratios for providing a higher torque in the outlet to higher gear ratios for overdriving output shaft (54, 354).

In operation, when input shaft 12 is connected to a power source, input shaft 12 may rotate at a certain rotational direction that may be dictated by the power source. For example, input shaft 12 may assume a clockwise rotation about longitudinal axis 14. Rotatable outer chamber 42, main sun gear 18, and secondary sun gear 26 may assume a clockwise rotation responsive to clockwise rotation of input shaft 12, since rotatable outer chamber 42, main sun gear 18, and secondary sun gear 26 are attached to or integrally formed with input shaft 12.

For example, in a car or a train, where output shaft is coupled with the wheels, at the beginning of motion, output shaft 54 may be stationary. Responsive to a clockwise rotation of main sun gear 18, pinions of main planet gear set 21 may assume a counter clockwise rotation. Since output shaft 54 is stationary, main carrier 20 may assume a clockwise rotation in response to pinions of main planet gear set 21 rotating in a counter clockwise direction. Secondary ring 30 may be attached to main carrier 20, consequently, second ring 30 may assume a clockwise rotation in response to the clockwise rotation of main carrier 20. Pinions of secondary planet gear set 27 may assume a clockwise rotation in response to the clockwise rotation of second ring 30, and since secondary sun 26 is rotating in a clockwise direction, as a result, secondary carrier 28 may also assume a clockwise rotation. Such clockwise rotation of secondary carrier 28 may be transferred to first gear 34. Second gear 38 may assume a clockwise rotation responsive to the clockwise rotation of first gear 34, although with a higher rpm due to the gear ratio between first gear 34 and second gear 38, as was discussed earlier. Inner rotor 52 of vane coupling mechanism 40 may assume a clockwise rotation responsive to the clockwise rotation of second gear 38. To this point, both rotatable outer chamber 42 and inner rotor 52 are rotating clockwise, however, as discussed, inner rotor 52 is rotating at a higher rpm.

In an exemplary embodiment, controller 56 may urge control valve 51 to be actuated into a fully open position. Since an entire inner volume of rotatable outer chamber 42 and fluid passageway 50 is filled with hydraulic fluid, in response to clockwise rotations of inner rotor 52 and rotatable outer chamber 42, the hydraulic fluid may freely circulate within vane coupling mechanism 40 due to positive displacement induced by vanes (66a-66d) of inner rotor 52 as they follow ellipsoidal inner surface 60 of cam ring 44. As used herein, the hydraulic fluid freely circulating may refer to the hydraulic fluid forced out of port 48a, flowing within fluid passageway 50 through control valve 51, and back into rotatable outer chamber 42 via port 48b. Such free circulation of fluid may not create any breaking effect between inner rotor 52 and rotatable outer chamber 42, meaning that each one of inner rotor 52 and rotatable outer chamber 42 continue their rotational motion without affecting each other through the hydraulic fluid.

In an exemplary embodiment, controller 56 may be configured to manipulate relative rotational motions of inner rotor 52 and rotatable outer chamber 42 by restricting the free circulation of the hydraulic fluid via urging control valve 51 to be actuated towards a close position. As used herein, manipulating relative rotational motions of inner rotor 52 and rotatable outer chamber 42 may refer to reducing the rpm of inner rotor 52, which has a higher rpm relative to rotatable outer chamber 42.

In an exemplary embodiment, controller 56 may be configured to reduce the rpm of inner rotor 52 by closing control valve 51. The hydraulic fluid flow may be restricted responsive to a partial closing of control valve 51, such restriction may exert pressure on inner rotor 52, due to the fact that inner rotor 52 is rotating at a higher rpm than rotatable outer chamber 42. The exerted fluid pressure on inner rotor 52 has a breaking effect on inner rotor 52 and it is as if rotatable outer chamber 42 is utilized for applying a breaking force onto inner rotor 52 via the hydraulic fluid. In an exemplary embodiment, the rpm of inner rotor 52 may be reduced responsive to control valve 51 being urged to close by controller 56. In an exemplary embodiment, based at least in part on the type of application, controller may be configured to urge control valve 51 to be actuated towards a close position following a time-dependent path. For example, the rate of closing of control valve 51 may be linear or following a curve. In an exemplary embodiment, based at least in part on the type of application, controller may further be configured to urge control valve 51 to be actuated between the fully open and fully close positions following a predetermined path, for example a sinusoidal curve, where control valve 51 may be periodically opened and closed.

In operation, when the rpm of inner rotor 52 is gradually reduced by gradually opening control valve 51, such reduction in rpm may be transferred from inner rotor 52 to first gear 34 via second gear 38, and then from first gear 34 to secondary carrier 28. Then, responsive to a reduction in the rpm of secondary carrier 28, an rpm of main carrier 20 may be reduced. In response to such reduction in the rpm of main carrier 20, a portion of power may be transferred to output shaft 54 via main ring gear 22. The portion of power transferred to output shaft 54 via main ring gear 22 may gradually increase responsive to a gradual reduction of the rpm of main carrier 20.

In an exemplary embodiment, gradual reduction in the rpm of inner rotor 52 by gradually opening control valve 51 may reach a point, at which responsive to a certain rpm of inner rotor 52, secondary ring gear 30, and in response, main carrier 20 may stop rotating. In other words, the rpm of main carrier 20 may become zero in response to the rpm of inner rotor 52 being reduced to a certain extent, which is based partially on gear ratios utilized in the system.

In other words, CVT 10 via utilizing vane coupling mechanism 40 may be capable of providing continuous low gear ratios between a first ratio corresponding to control valve 51 being fully opened and a second ratio when control valve 51 is closed to an extent, where main carrier 20 comes to a full stop. From this point on, gradual reduction in the rpm of inner rotor 52 by further gradually closing control valve 51 may lead to main carrier 20 to assume a counter clockwise rotation. In an exemplary embodiment, responsive to further closing control valve 51, the counter-clockwise rpm of main carrier 20 increases and based at least in part on the rpm of main carrier 20, CVT 10 may either function as a direct drive or an overdrive.

In an exemplary embodiment, CVT 10 may further include a sensor 76 that may be coupled to output shaft 54 and controller 56. In an exemplary embodiment, sensor 76 may be configured to measure an rpm of output shaft 54 and then transmit the measured rpm to controller 56. In an exemplary embodiment, controller 56 may include a processor 78 that may be coupled to a memory 80. In an exemplary embodiment, memory 80 may include executable instructions that may urge processor 78 to receive the measured rpm of output shaft 54 form sensor 76, urge control valve 51 to change position between a fully closed position and a fully opened position based at least in part on the received rpm of output shaft 54.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A continuously variable transmission (CVT), comprising:
   an input shaft rotatable about a longitudinal axis of the input shaft;
   a main planetary gear assembly comprising:
     a main sun gear coupled and rotatable with the input shaft about the longitudinal axis of the input shaft;
     a main carrier; and
     a main ring gear;
   a secondary planetary gear assembly comprising:
     a secondary sun gear coupled and rotatable with the input shaft about the longitudinal axis of the input shaft;
     a secondary carrier; and
     a secondary ring gear coupled and rotatable with the main carrier about the longitudinal axis of the input shaft;
   an eccentric gear set comprising:
     a first gear mounted in a bearing unit, the first gear coupled and rotatable with the secondary carrier about the longitudinal axis of the input shaft; and
     a second gear mounted within and meshed with the first gear, the second gear smaller than the first gear, the second gear rotatable with the first gear about the longitudinal axis of the input shaft;
   a vane coupling mechanism comprising:
     a rotatable outer chamber coupled and rotatable with the input shaft about the longitudinal axis of the input shaft, the rotatable outer chamber comprising a cam ring disposed between two seal plates and two inlet/outlet ports in fluid communication with the rotatable outer chamber, the two inlet/outlet ports further connected in fluid communication with each other via a fluid passageway, the rotatable outer chamber filled with hydraulic fluid;
     a control valve mounted on the fluid passageway, the control valve configured to control hydraulic fluid flow within the fluid passageway by opening/closing the fluid passageway; and
     an inner rotor coaxially disposed within the cam ring, the inner rotor coupled and rotatable with the second gear;
   an output shaft coupled and rotatable with the main ring gear; and
   a controller coupled with the control valve, the controller configured to change a valve position of the control valve, the valve position comprising a position between a fully closed position and a fully opened position.

2. The CVT of claim 1, wherein the cam ring comprises an ellipsoidal opening with an ellipsoidal inner surface, the ellipsoidal opening sealed between the two seal plates.

3. The CVT of claim 2, wherein the inner rotor comprises:
   a cylindrical main body coaxially disposed within the ellipsoidal opening of the cam ring;
   at least two radially extended vane slots on the cylindrical main body; and
   at least two vanes slidably disposed within the at least two vane slots and rotatable with the inner rotor, each of the at least two vanes radially slidable along a longitudinal axis of a respective vane slot of the at least two vane slots with tips of the at least two vanes contacting the ellipsoidal inner surface of the cam ring.

4. The CVT of claim 3, wherein an internal volume of the rotatable outer chamber between an inner surface of the rotatable outer chamber and an outer surface of the main cylindrical body of the inner rotor is filled with the hydraulic fluid, and wherein an entire volume of the communication line is filled with the hydraulic fluid.

5. The CVT of claim 4, wherein the two seal plates are attached at both open ends of the cam ring, the open ends spaced apart along the longitudinal axis of the input shaft with planes of the open ends perpendicular to the longitudinal axis of the input shaft, the two seal plates and the cam ring rotatable together about the longitudinal axis of the input shaft, the two plates attached to the cam ring in axial and angular alignment with the cam ring without relative rotational movements between the two seal plates and the cam ring.

6. The CVT of claim 3, wherein the input shaft, the rotatable outer chamber, the secondary sun gear, and the primary sun gear are integrally formed and rotatable about the longitudinal axis of the input shaft.

7. The CVT of claim 3, wherein the main carrier is further attached to a main planet gear set, the main planet gear set comprising a plurality of pinions mechanically engaged between the main ring gear and the main sun gear.

8. The CVT of claim 7, wherein the secondary carrier is further attached to a secondary planet gear set, the secondary planet gear set comprising a plurality of pinions mechanically engaged between the secondary ring gear and the secondary sun gear.

9. The CVT of claim 1, wherein a gear ratio of the second gear to the first gear is at most 1:10.

10. The CVT of claim 9, further comprising a sensor coupled to the output shaft, the sensor configured to measure and transmit an rpm of the output shaft to the controller.

11. The CVT of claim 10, wherein the controller is coupled with the sensor, the controller comprising:
    at least one processor; and
    at least one memory coupled to the at least one processor, the at least one memory storing executable instructions to urge the at least one processor to:
      receive the measured rpm of the output shaft; and
      change the position of the control valve between the fully opened position and the fully closed position based at least in part on the received rpm of the output shaft.

* * * * *